(12) United States Patent
Harashima et al.

(10) Patent No.: US 11,739,807 B2
(45) Date of Patent: Aug. 29, 2023

(54) ENERGY ABSORPTION MEMBER

(71) Applicant: NITTO BOSEKI CO., LTD., Fukushima (JP)

(72) Inventors: Shunsuke Harashima, Fukushima (JP); Kazunori Sano, Fukushima (JP); Norio Hirayama, Chiba (JP); Kazuhiro Sakata, Chiba (JP)

(73) Assignee: Nitto Boseki Co., Ltd., Fukushima (JP)

( * ) Notice: Subject to any disclaimer, the term of this patent is extended or adjusted under 35 U.S.C. 154(b) by 192 days.

(21) Appl. No.: 16/476,334

(22) PCT Filed: Oct. 17, 2018

(86) PCT No.: PCT/JP2018/038619
§ 371 (c)(1),
(2) Date: Jul. 8, 2019

(87) PCT Pub. No.: WO2019/078236
PCT Pub. Date: Apr. 25, 2019

(65) Prior Publication Data
US 2020/0018373 A1 Jan. 16, 2020

(30) Foreign Application Priority Data
Oct. 20, 2017 (JP) ................. 2017-203938

(51) Int. Cl.
*F16F 7/12* (2006.01)
*F16F 7/00* (2006.01)
(Continued)

(52) U.S. Cl.
CPC .............. *F16F 7/124* (2013.01); *C03C 3/091* (2013.01); *C03C 13/00* (2013.01); *C08J 5/043* (2013.01);
(Continued)

(58) Field of Classification Search
CPC ........... F16F 7/24; F16F 7/003; C03C 13/091; C03C 13/00; C08J 5/043; C08J 5/24
(Continued)

(56) References Cited

U.S. PATENT DOCUMENTS 5,008,145 A * 4/1991 Kinson .................... C08K 7/14
428/361
5,547,735 A 8/1996 Roebroeks et al.
(Continued)

FOREIGN PATENT DOCUMENTS

JP S60-109630 A 6/1985
JP H03-112743 A 5/1991
(Continued)

OTHER PUBLICATIONS

High performance fibers, Bunsell, A. R. (Year: 2005).*
(Continued)

*Primary Examiner* — Jennifer A Boyd
*Assistant Examiner* — Ricardo E Lopez
(74) *Attorney, Agent, or Firm* — Carrier, Shende & Associates P.C.; Joseph P. Carrier; Fulchand P. Shende

(57) ABSTRACT

An energy absorption member (21) includes a hollow cylindrical fiber-reinforced composite material including reinforcement fibers (22), in which tensile strength S (GPa), tensile modulus of elasticity M (GPa), and elongation rate E (%) satisfy the following expression (1), and a curable resin composition with which the reinforcement fibers (22) are impregnated. The volume content of the reinforcement fibers (22) in the fiber-reinforced composite material is 30 to 80%.

$$11.0 \leq S^2 \times M^{1/8}/E^{1/2} \leq 22.0 \qquad (1)$$

14 Claims, 1 Drawing Sheet

(51) Int. Cl.
*C08J 5/04* (2006.01)
*C08J 5/24* (2006.01)
*C03C 13/00* (2006.01)
*C03C 3/091* (2006.01)

(52) U.S. Cl.
CPC ............... *C08J 5/244* (2021.05); *F16F 7/003* (2013.01); *C03C 2213/00* (2013.01); *C08J 2363/00* (2013.01); *F16F 2224/0241* (2013.01); *F16F 2228/007* (2013.01); *F16F 2234/02* (2013.01)

(58) Field of Classification Search
USPC .......................................................... 188/377
See application file for complete search history.

(56) References Cited

U.S. PATENT DOCUMENTS

2006/0204763 A1* 9/2006 Hartman ................. C03C 25/26
428/417
2011/0174410 A1* 7/2011 Li ........................ F16L 11/085
138/141
2012/0178610 A1* 7/2012 Hublikar ................ C03C 3/091
501/32

FOREIGN PATENT DOCUMENTS

| JP | 06-346935 A | 12/1994 |
|---|---|---|
| JP | H06-341477 A | 12/1994 |
| JP | H08-001099 U | 7/1996 |
| JP | 2004-116564 A | 4/2004 |
| JP | 2008-267393 A | 11/2008 |
| JP | 2015-148282 A | 8/2015 |

OTHER PUBLICATIONS

Supplementary European Search Report dated Jan. 8, 2020 issued in the corresponding EP Patent Application No. 18867355.2.

Office Action dated Nov. 15, 2019 issued in the corresponding Korean patent application No. 10-2019-7021632.

* cited by examiner

ENERGY ABSORPTION MEMBER

TECHNICAL FIELD

The present invention relates to an energy absorption member.

BACKGROUND ART

It has been proposed to use a cylindrical energy absorption member composed of a fiber reinforced resin in a crush box that is a member to absorb collision energy generated at the time of a car collision.

For example, in Patent Literature 1, an energy absorption member is described which is composed of a fiber reinforced resin using glass fibers comprising an E glass composition (generally, a composition containing $SiO_2$ in the range of 52.0 to 56.0% by mass, $Al_2O_3$ in the range of 12.0 to 16.0% by mass, MgO and CaO totally in the range of 20.0 to 25.0% by mass, and $B_2O_3$ in the range of 5.0 to 10.0% by mass based on the total amount of the glass) (hereinafter referred to as E glass fibers) as the reinforcement fibers. Further, Patent Literature 2 describes an energy absorption member composed of a fiber reinforced resin using carbon fibers as the reinforcement fibers.

CITATION LIST

Patent Literature

Patent Literature 1: Japanese Patent Laid Open No. H03-112743

Patent Literature 2: Japanese Patent Laid Open No. 2008-267393

SUMMARY OF INVENTION

Technical Problem

However, in an energy absorption member of Patent Literature 1 using E glass fibers as reinforcement fibers, there was a disadvantage that an impact could not be absorbed stably, because propagation of fracture by impact was not uniform.

Meanwhile, in the energy absorption member of Patent Literature 2 using carbon fibers as the reinforcement fibers, there was a disadvantage that the recoil at the moment of receiving an impact is strong.

An object of the present invention is to provide an energy absorption member in which the above disadvantage is eliminated, specifically the recoil at the moment of receiving an impact is small, and fracture by impact propagates uniformly enabling stable absorption of the impact.

Solution to Problem

In order to achieve the object, the energy absorption member of the present invention is to be an energy absorption member comprising a hollow cylindrical fiber-reinforced composite material composed of reinforcement fibers in which the tensile strength S (GPa), the tensile modulus of elasticity M (GPa), and the elongation rate E (%) satisfy the following expression (1), and a curable resin composition with which the reinforcement fibers are impregnated, wherein in the fiber-reinforced composite material, the volume content of the reinforcement fibers is 30 to 80%.

$$11.0 \leq S^2 \times M^{1/8} / E^{1/2} \leq 22.0 \quad (1)$$

In the energy absorber of the present invention, when the tensile strength S, the tensile modulus of elasticity M, and the elongation rate E satisfy the above expression (1), and the volume content of the reinforcement fibers in the fiber-reinforced composite material is in the above range, an energy absorption member, in which the recoil at the moment of receiving an impact is small, and fracture by impact uniformly propagates, so that the impact can be stably absorbed, is obtained.

In this regard, that the recoil at the moment of receiving an impact is small means: when a load displacement curve is drawn by a large scale falling weight impact test, in which a hollow cylindrical fiber-reinforced composite material is held by an upper fixture and a lower fixture, and a falling weight is made to free-fall on to the upper fixture to give an impact compressive load in the axial direction under the test conditions that the mass of the falling weight is 200 kg, the free fall height is 2.46 m to gain the striking velocity of 25 km/h, the difference between the load at the maximum load point (hereinafter referred to as the "maximum load") and the load at the local minimum point appearing immediately after the maximum load point (hereinafter referred to as the "first local minimum point load") is less than 30 kN. Meanwhile, that fracture by impact propagates uniformly enabling stable absorption of the impact means: when a load displacement curve is drawn by a large scale falling weight impact test, in which a hollow cylindrical fiber-reinforced composite material is held by an upper fixture and a lower fixture, and a falling weight is made to free-fall on to the upper fixture to give an impact compressive load in the axial direction under the test conditions that the mass of the falling weight is 200 kg, the free fall height is 2.46 m to gain the striking velocity of 25 km/h, the difference between the load at a local maximum point where the load becomes maximum (hereinafter referred to as the "maximum load at local maximum points") and the load at a local minimum point where the load becomes minimum (hereinafter referred to as the "minimum load at local minimum points") among a plurality of local maximum points and local minimum points, which appear after the local minimum point appearing immediately after the maximum load point, and before the displacement reaches 70 mm is 25 kN or less.

With respect to the energy absorbing material of the present invention, when the volume content of the reinforcement fibers in the fiber-reinforced composite material is less than 30%, fracture by impact does not uniformly propagate, and cannot stably absorb the impact. On the other hand, when the volume content of the reinforcement fibers is over 80%, the reinforcement fibers are not sufficiently impregnated with a curable resin composition, and a fiber-reinforced composite material cannot be obtained.

Further, in the energy absorption member of the present invention, a plurality of the reinforcement fibers are disposed in a spiral form to cross each other in the fiber-reinforced composite material. The crossing angle of the reinforcement fibers crossing each other is preferably 100° or more and 160° or less.

In the energy absorption member of the present invention, when the crossing angle is in the range of 100° or more and 160° or less, the fracture by impact propagates more uniformly, so that an energy absorption member capable of absorbing an impact more stably is obtained.

In this regard, that fracture by impact propagates more uniformly, and the impact can be absorbed more stably means that the difference between the maximum load at local maximum points and the minimum load at local minimum points is 20 kN or less.

Further, in the energy absorption member of the present invention, a plurality of the reinforcement fibers are disposed in a spiral form to cross each other in the fiber-reinforced composite material. The crossing angle of the reinforcement fibers crossing each other is further preferably 70° or more and less than 100°.

In the energy absorption member of the present invention, when the crossing angle is in the range of 70° or more and less than 100°, the recoil at the moment of receiving an impact becomes smaller, and an extremely high amount of energy absorbed is realized.

In this regard, that the recoil at the moment of receiving an impact becomes smaller means that the difference between the maximum load and the load at the first local minimum point is 20 kN or less.

Further, that an extremely high amount of energy absorbed is realized means: when a load displacement curve is drawn by a large scale falling weight impact test, in which a hollow cylindrical fiber-reinforced composite material is held by an upper fixture and a lower fixture, and a falling weight is made to free-fall on to the upper fixture to give an impact compressive load in the axial direction under the test conditions that the mass of the falling weight is 200 kg, the free fall height is 2.46 m to gain the striking velocity of 25 km/h, the amount of energy absorbed until the displacement reaches 70 mm (hereinafter referred to as "total amount of energy absorbed at 70 mm") is 3300 J or more. In this case, the total amount of energy absorbed at 70 mm may be also determined as an average of the energy absorption amount at a displacement just before 70 mm and the amount of energy absorbed at a displacement just after 70 mm.

Further, in the energy absorption member of the present invention, it is preferable that the volume content of the reinforcement fibers in the fiber-reinforced composite material is 50 to 70%.

When the volume content of the reinforcement fibers in the fiber-reinforced composite material is 50 to 70%, a high amount of energy absorbed is realized.

In this regard, that a high energy amount of energy absorbed is realized means that the total amount of energy absorbed at 70 mm is 2500 J or more.

In the energy absorption member of the present invention, it is preferable that the reinforcement fiber is a glass fiber, which contains $SiO_2$ in a range of 56.5 to 68.0% by mass, $Al_2O_3$ in a range of 13.0 to 28.0% by mass, and MgO in a range of 5.0 to 12.0% by mass based on a total amount of the glass fiber, that the total content of $SiO_2$, $Al_2O_3$, and MgO is 77.0% by mass or more, and that a ratio of the content of MgO to the content of $SiO_2$ ($MgO/SiO_2$) is 0.09 to 0.18.

When the reinforcement fiber is a glass fiber that satisfies the above requirements with respect to the content of each of $SiO_2$, $Al_2O_3$ and MgO, the glass fiber can have an appropriate tensile strength, tensile modulus of elasticity, and elongation rate, and the energy absorption member using the glass fiber as the reinforcement fiber exhibits a smaller recoil at receiving an impact, and uniform propagation of fracture by impact, and is therefore able to absorb an impact stably.

In a case where the content of $SiO_2$ is less than 56.5% by mass, the obtained glass fiber does not have an appropriate tensile strength and elongation rate, and an energy absorption member in which the obtained glass fiber is used as the reinforcement fiber cannot attain stable energy absorption. On the other hand, in a case where the content of $SiO_2$ is more than 68.0% by mass, when a glass composition composing the glass fiber is melted, the viscosity of the molten glass composition becomes high, and the production of glass fiber itself becomes difficult.

In a case where the content of $Al_2O_3$ is less than 13.0% by mass, the obtained glass fiber does not have an appropriate tensile strength, tensile modulus of elasticity, and elongation rate, and an energy absorption member in which the obtained glass fiber is used as the reinforcement fiber cannot attain stable energy absorption. On the other hand, in a case where the content of $Al_2O_3$ is more than 28.0% by mass, devitrification (a phenomenon in which minute crystals precipitate in the glass) is prone to occur in melting a glass composition composing the glass fiber, and the production of the glass fiber itself becomes difficult. In addition, the temperature necessary for melting the glass composition is increased, which causes a disadvantage that the life of a melting furnace is shortened.

In a case where the content of MgO is less than 5.0% by mass, the obtained glass fiber does not have an appropriate tensile strength, tensile modulus of elasticity, and elongation rate, and an energy absorption member in which the obtained glass fiber is used as the reinforcement fiber cannot attain stable energy absorption. On the other hand, in a case where the content of MgO is more than 12.0% by mass, devitrification is prone to occur in melting a glass composition composing the glass fiber, and the working temperature range is narrowed which makes the production of glass fiber itself becomes difficult.

In a case where the total content of $SiO_2$, $Al_2O_3$ and MgO is less than 77.0% by mass, the obtained glass fiber does not have an appropriate tensile strength, tensile modulus of elasticity, and elongation rate, and an energy absorption member in which the obtained glass fiber is used as the reinforcement fiber cannot attain stable energy absorption.

In a case where the $MgO/SiO_2$ is less than 0.09, the obtained glass fiber does not have an appropriate tensile strength, tensile modulus of elasticity, and elongation rate, and an energy absorption member in which the obtained glass fiber is used as the reinforcement fiber cannot attain stable energy absorption. On the other hand, in a case where the $MgO/SiO_2$ exceeds 0.18, devitrification is prone to occur in melting a glass composition composing the glass fiber, and the production of the glass fiber itself becomes difficult.

DESCRIPTION OF EMBODIMENTS

Figure 1:
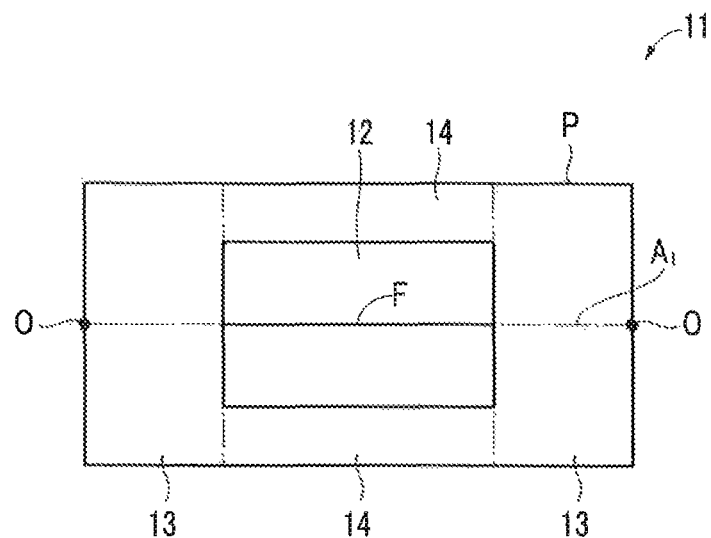
FIG. 1 is a diagram showing a monofilament test piece used for measuring the tensile strength S, tensile modulus of elasticity M, and elongation rate E of a reinforcement fiber in a fiber-reinforced composite material composing the energy absorption member of the present invention.

Next, embodiments of the present invention will be described in more detail with reference to the attached drawings.

The energy absorption member of the present embodiment is an energy absorption member comprising a hollow cylindrical fiber-reinforced composite material composed of reinforcement fibers in which the tensile strength S (GPa), tensile modulus of elasticity M (GPa), and elongation rate E (%) satisfy the following expression (1), and a curable resin composition with which the reinforcement fibers are impregnated; wherein the volume content of the reinforcement fibers in the fiber-reinforced composite material is 30 to 80%. With respect to the energy absorption member of the present embodiment, when the tensile strength S, tensile modulus of elasticity M, and elongation rate E satisfy the following expression (1), and the volume content of the reinforcement fibers is in the above range, the recoil at the moment of receiving an impact becomes small, and the fracture by impact uniformly propagates, so that the impact can be stably absorbed.

$$11.0 \leq S^2 \times M^{1/8}/E^{1/2} \leq 22.0 \tag{1}$$

In the energy absorption member of the present embodiment, the tensile strength S of the reinforcement fibers is, for example, in the range of 3.7 to 5.5 GPa, preferably in the range of 3.8 to 5.2 GPa, more preferably in the range of 3.9 to 5.0 GPa, and further preferably in the range of 4.0 to 4.8 GPa. When the S is less than 3.7 GPa, it becomes difficult for fracture by impact to uniformly propagate, making it difficult to stably absorb the impact. On the other hand, when the S exceeds 5.5 GPa, the recoil at the moment of receiving an impact becomes large.

The tensile strength S of a reinforcement fiber is calculated by dividing the maximum load at a tensile break of a reinforcement fiber (when the reinforcement fiber is formed of a plurality of monofilaments, one of the monofilaments) by the cross-sectional area of the reinforcement fiber.

In particular, when the reinforcement fiber is a glass fiber, the tensile strength S of the glass fiber can be measured by the following procedure.

[Method of Measuring Tensile Strength S]

(1-1) A glass batch (a preparation obtained by mixing glass raw materials), or glass fibers (when an organic matter adheres to the surface of the glass fibers, or the glass fibers are contained in an organic matter (resin) mainly as a reinforcement material, the fibers are used after the organic matter is removed, for example, by heating in a muffle furnace at 300 to 630° C. for about 2 to 24 hours) are placed in a platinum crucible, and melted in an electric furnace keeping a temperature of 1550° C. for 6 hours with stirring to obtain homogeneous molten glass.

(1-2) The obtained molten glass is cast over a carbon plate to produce a glass cullet. The obtained glass cullet is charged into a small cylindrical platinum bushing having a circular nozzle tip at the bottom thereof, and the bushing is heated to a predetermined temperature to melt the glass cullet such that the viscosity of the charged glass cullet becomes 1000±150 poise to yield a molten glass.

(1-3) The molten glass discharged through the nozzle tip of the platinum bushing is wound up at a predetermined speed by a winder while causing stretching to a glass fiber diameter of 13±2 μm and solidification to obtain a glass fiber with a perfectly circular cross section.

(1-4) A single fiber (monofilament) between the nozzle tip of the platinum bushing and the winder is taken as a sample for tensile strength evaluation of a glass fiber in a state where deterioration due to contact or friction has been minimized.

(1-5) As shown in FIG. 1, the obtained monofilament F is placed and bonded in the longitudinal direction along the line Ai connecting the center points O and O of the short sides of the mount P to prepare a monofilament test piece 11. The mount P has a cut out section 12 inside at the center, such that the short side and the long side of the mount P are parallel to the short side and the long side, respectively, of the cut out section 12. There are grip sections 13 between the short side of the cut out section 12 and the short side of the mount P, which are to be held by grips of a tensile testing machine. There are support sections 14 between the long side of the cut out section 12 and the long side of the mount P, which connect and support the two grip sections 13, 13. In the mount P, the short side is 25 mm long, and the long side is 50 mm long, and in the cut out section 12, the short side is 15 mm long, and the long side is 25 mm long. In addition, in the grip sections 13, the short side is 12.5 mm long, and the long side is 25 mm long, and in the support sections 14, the short side is 5 mm long, and the long side is 25 mm long.

(1-6) The diameter of the monofilament F is measured with a scanning electron microscope (trade name: S-3400, manufactured by Hitachi, Ltd.), and the cross-sectional area of the monofilament F is calculated from the obtained diameter.

(1-7) The grip sections 13, 13 are held by an upper and lower grips, for which the distance between the grips is set at 25 mm, of a tensile testing machine (tabletop material testing instrument STB-1225S, manufactured by A&D Company, Limited), and then the support sections 14, 14 are cut off. Using such monofilament F alone connecting the grip sections 13, 13, a tensile test is carried out at a crosshead speed of 5 mm/min.

(1-8) The tensile strength S is calculated by dividing the maximum load value at a break of the monofilament F by the cross-sectional area of the monofilament F. In this regard, in a case where an incomplete break such as filament cast-off or filament crease occurs with respect to any of monofilament test pieces 11, such test piece is excluded, and an average value of n=30 is regarded as the measured value of the tensile strength S.

In the energy absorption member of the present embodiment, the tensile modulus of elasticity M of the reinforcement fiber is, for example, in the range of 77 to 110 GPa, preferably in the range of 78 to 100 GPa, more preferably in the range of 79 to 95 GPa, and further preferably in the range of 80 to 90 GPa. When the tensile modulus of elasticity M is less than 77 GPa, it is difficult for fracture by impact to propagate uniformly, which makes it difficult to stably absorb the impact. On the other hand, when the tensile modulus of elasticity M is more than 110 GPa, the recoil at the moment of receiving an impact becomes large.

In this regard, the tensile modulus of elasticity M of a reinforcement fiber is obtained by applying a load to the reinforcement fiber (in a case where the reinforcement fiber is composed of a plurality of monofilaments, one of the monofilament), defining the stresses σ1 and σ2 at 2 points as those corresponding to the strains ε1=0.0005 and ε2=0.0025, respectively, and dividing the stress difference (ε2−ε1) by the strain difference (ε2−ε1).

In particular, when the reinforcement fiber is a glass fiber, the tensile modulus of elasticity M of the glass fiber can be measured by the following procedure.

[Method of Measuring Tensile Modulus of Elasticity M]

(2-1) A monofilament is obtained by the same operation as (1-1) to (1-4) of the method of measuring tensile strength S.

(2-2) As shown in FIG. 1, the obtained monofilament F is placed and bonded in the longitudinal direction along the line Ai connecting the center points O and O of the short sides of the mount P to prepare a monofilament test piece 11. The mount P has a cut out section 12 inside at the center, such that the short side and the long side of the mount P are parallel to the short side and the long side, respectively, of the cut out section 12. There are grip sections 13 between the short side of the cut out section 12 and the short side of the mount P, which are to be held by grips of a tensile testing machine. There are support sections 14 between the long side of the cut out section 12 and the long side of the mount P, which connect and support the two grip sections 13, 13. In the mount P, the short side is 25 mm long, and the long side is 75 mm long, and in the cut out section 12, the short side is 15 mm long, and the long side is 50 mm long. In addition, in the grip sections 13, the short side is 12.5 mm long, and the long side is 25 mm long, and in the support sections 14, the short side is 5 mm long, and the long side is 50 mm long.

(2-3) The diameter of the monofilament F is measured with a scanning electron microscope (trade name: S-3400, manufactured by Hitachi, Ltd.), and the cross-sectional area of the monofilament F is calculated from the obtained diameter.

(2-4) The grip sections 13, 13 are held by an upper and lower grips, for which the distance between the grips is set at 50 mm, of a tensile testing machine (tabletop material testing instrument STB-1225S, manufactured by A&D Company, Limited), and then the support sections 14 are cut off. Using such monofilament F alone connecting the grip sections 13, 13, a tensile test is carried out at a crosshead speed of 5 mm/min.

(2-5) A tensile modulus of elasticity M is calculated by dividing the stress difference (σ2−σ1) by the strain difference (ε2−ε1), wherein the stresses σ1 and σ2 at 2 points are defined as those corresponding to the strains ε1=0.0005 and ε2=0.0025, respectively. In this regard, a monofilament test piece 11 in which the filament cast-off occurred during the measurement was excluded, and the average value of n=15 was regarded as the measurement value of the tensile modulus of elasticity M.

In the energy absorption member of the present embodiment, the elongation rate E of the reinforcement fiber is, for example, in the range of 3.0 to 7.0%, preferably in the range of 4.0 to 6.8%, more preferably in the range of 5.0 to 6.5%, and further preferably in the range of 5.5 to 6.2%. When the elongation rate E is less than 3.0%, the recoil at the moment of receiving an impact tends to be large. On the other hand, when the elongation rate E is more than 7.0%, the deformation due to an impact load is too large, while the length of the energy absorption member may be limited due to the restriction of the installation space, etc. Therefore, when the allowable amount of deformation by an impact load is limited, a high amount of energy absorbed cannot be realized.

By performing the same operation as in the method of measuring tensile strength S, the elongation rate E of the reinforcement fiber is calculated by dividing the displacement at the time of a break of the monofilament by the distance between the grips.

In particular, when the reinforcement fiber is a glass fiber, the elongation rate may be measured by performing the same operation as in the method of measuring tensile strength S of the glass fiber to find the displacement when the maximum load value is obtained, and by dividing the displacement by the distance between the grips (25 mm) to calculate the percentage.

In the energy absorption member of the present embodiment, when the tensile strength S, tensile modulus of elasticity M, and elongation rate E do not satisfy the expression (1), that is, $S^2 \times M^{1/8}/E^{1/2}$ is less than 11.0, fracture by impact does not uniformly propagate, and the impact cannot be stably absorbed. Meanwhile, when $S^2 \times M^{1/8}/E^{1/2}$ exceeds 22.0, the recoil at the moment of receiving an impact becomes large.

Further, in the energy absorption member of the present embodiment, it is preferable that the tensile strength S, tensile modulus of elasticity M, and elongation rate E should satisfy the following expression (2), because the recoil at the moment of receiving an impact is more surely reduced, and fracture by impact more surely propagates uniformly enabling stable absorption of the impact.

$$11.5 \leq S^2 \times M^{1/8}/E^{1/2} \leq 20.0 \quad (2)$$

Further, in the energy absorption member of the present embodiment, it is more preferable that the tensile strength S, tensile modulus of elasticity M, and elongation rate E satisfy the following expression (3).

$$11.7 \leq S^2 \times M^{1/8}/E^{1/2} \leq 19.0 \quad (3)$$

Further, in the energy absorption member of the present embodiment, it is further preferable that the tensile strength S, tensile modulus of elasticity M, and elongation rate E satisfy the following expression (4).

$$12.0 \leq S^2 \times M^{1/8}/E^{1/2} \leq 18.0 \quad (4)$$

In the energy absorption member of the present embodiment, the weight of the reinforcement fiber is preferably 10 to 10000 tex (g/km), and more preferably 100 to 4000 tex, further preferably 200 to 2500 tex, and particularly preferably 280 to 2300 tex. When the size of the reinforcement fibers is within the range, forming of the fiber-reinforced composite material becomes easy.

In the energy absorption member of the present invention, a glass fiber, which contains $SiO_2$ in the range of 56.5 to 68.0% by mass, $Al_2O_3$ in the range of 13.0 to 28.0% by mass, and MgO in the range of 5.0 to 12.0% by mass based on the total amount of the reinforcement fiber, wherein the total content of $SiO_2$, $Al_2O_3$, and MgO is 77.0% by mass or more, and the ratio ($MgO/SiO_2$) of the content of MgO to the content of $SiO_2$ is 0.09 to 0.18, may be preferably used as the reinforcement fiber satisfying the expression (1).

In the energy absorption member of the present embodiment, when the content of $SiO_2$ in a glass fiber which is a reinforcement fiber is less than 56.5% by mass, the obtained glass fiber does not have an appropriate tensile strength and elongation rate, and an energy absorption member in which the obtained glass fiber is used as the reinforcement fiber cannot attain stable energy absorption. On the other hand, in a case where the content of $SiO_2$ is more than 68.0% by mass, when a glass composition composing the glass fiber is melted, the viscosity of the molten glass composition becomes high, and the production of the glass fiber itself becomes difficult.

Further, in the energy absorption member of the present embodiment, the content of $SiO_2$ in the glass fiber which is the reinforcement fiber is preferably 56.7 to 65.0% by mass, more preferably 56.9 to 63.0% by mass, further preferably 57.0 to 61.5% by mass, particularly preferably 57.1 to 60.0% by mass, and most preferably 57.2 to 59.5% by mass.

In the energy absorption member of the present embodiment, when the content of $Al_2O_3$ of the glass fiber which is the reinforcement fiber is less than 13.0% by mass, the obtained glass fiber does not express an appropriate tensile strength, tensile modulus of elasticity, and elongation rate, and therefore an energy absorption member using the glass fiber as the reinforcement fiber cannot realize stable energy absorption. Meanwhile, when the content of $Al_2O_3$ exceeds 28.0% by mass, devitrification is prone to occur when a glass composition composing the glass fiber is melted, and the glass fiber production itself becomes difficult. In addition, the temperature necessary for melting the glass composition is increased, which causes a disadvantage that the life of the melting furnace is shortened.

In the energy absorption member of the present embodiment, the content of $Al_2O_3$ in the glass fiber which is the reinforcement fiber is preferably 14.0 to 25.0% by mass, more preferably 14.5 to 22.0% by mass, further preferably 15.0 to 20.0% by mass, particularly preferably 15.5 to 19.5% by mass, and most preferably 16.0 to 19.2% by mass.

In the energy absorption member of the present embodiment, when the content of MgO in the glass fiber which is the reinforcement fiber is less than 5.0% by mass, the obtained glass fiber does not express an appropriate tensile strength, tensile modulus of elasticity, and elongation rate, and therefore an energy absorption member using the glass fiber as the reinforcement fiber cannot realize stable energy absorption. Meanwhile, when the content of MgO exceeds 12.0% by mass, devitrification is prone to occur when a glass composition composing the glass fiber is melted, and the glass fiber production itself becomes difficult, because the workable temperature range is narrowed.

In the energy absorption member of the present embodiment, the content of MgO in the glass fiber which is the reinforcement fiber is preferably 6.0 to 11.5% by mass, more preferably 7.0 to 11.0% by mass, further preferably 8.0 to 10.5% by mass, and particularly preferably 9.0 to 10.2% by mass.

In the energy absorption member of the present embodiment, when the total content of $SiO_2$, $Al_2O_3$, and MgO in the glass fiber which is the reinforcement fiber is less than 77.0% by mass, the obtained glass fiber does not express an appropriate tensile strength, tensile modulus of elasticity, and elongation rate, and therefore an energy absorption member using the glass fiber as the reinforcement fiber cannot realize stable energy absorption.

Further, in the energy absorption member of the present embodiment, the total content of $SiO_2$, $Al_2O_3$, and MgO in the glass fiber which is the reinforcement fiber is preferably 80.0% by mass or more, more preferably 82.0% by mass or more, further preferably 84.0% by mass or more, and particularly preferably 85.0% by mass or more.

In the energy absorption member of the present embodiment, when the ratio ($MgO/SiO_2$) of the content of MgO to the content of $SiO_2$ in the glass fiber which is the reinforcement fiber is less than 0.09, the obtained glass fiber does not express an appropriate tensile strength, tensile modulus of elasticity, and elongation rate, and therefore an energy absorption member using the glass fiber as the reinforcement fiber cannot realize stable energy absorption. Meanwhile, when the $MgO/SiO_2$ exceeds 0.18, devitrification is prone to occur when a glass composition composing the glass fiber is melted, and the glass fiber production itself becomes difficult.

In the energy absorption member of the present embodiment, the ratio ($MgO/SiO_2$) of the content of MgO to the content of $SiO_2$ in the glass fiber which is the reinforcement fiber is preferably in the range of 0.120 to 0.175, more preferably in the range of 0.130 to 0.170, and further preferably in the range of 0.140 to 0.165.

In the energy absorption member of the present embodiment, the glass fiber which is the reinforcement fiber may contain CaO, for example, in the range of 6.0 to 14.0% by mass, preferably in the range of 8.0 to 13.0% by mass, and more preferably in the range of 10.0 to 12.5% by mass.

In the energy absorption member of the present embodiment, the glass fiber which is the reinforcement fiber may contain $B_2O_3$, for example, in the range of 0.1 to 2.0% by mass, preferably in the range of 0.5 to 1.5% by mass, and more preferably in the range of 0.8 to 1.2% by mass.

In the energy absorption member of the present embodiment, the glass fiber which is the reinforcement fiber may contain $Fe_2O_3$, $Na_2O$, $K_2O$, $Li_2O$, SrO, and $TiO_2$ at the total content in the range of 0.05 to 3.0% by mass, preferably in the range of 0.1 to 0.8% by mass, and more preferably in the range of 0.2 to 0.5% by mass.

In this regard, the content of each component in the glass fiber may be measured using an ICP emission spectrometry apparatus with respect to light elements of B and Li, and using a wavelength-dispersive X-ray fluorescence spectrometer with respect to other elements.

As a measuring method, firstly a glass batch (a preparation obtained by mixing glass raw materials), or a glass fiber (when an organic matter adheres to the surface of the glass fiber, or the glass fiber is included in an organic matter (resin) mainly as a reinforcement material, the glass is used after the organic matter is removed, for example, by heating it in a muffle furnace at 300 to 600° C. for about 2 to 24 hours) is placed in a platinum crucible, and melted in an electric furnace at a temperature of 1550° C. for 6 hours with stirring to obtain homogeneous molten glass. Next, the obtained molten glass is cast over a carbon plate to produce a glass cullet, which is then ground to powder. With respect to the light elements of B and Li, the glass powder is decomposed by alkali fusion decomposition, and then quantitatively analyzed using an ICP emission spectrometry apparatus. With respect to other elements, the glass powder is formed into a disk shape with a press, and then quantitatively analyzed using a wavelength-dispersive X-ray fluorescence spectrometer. From these quantitative analysis results the amount of each component in terms of an oxide, as well as the total amount are calculated. From these values, the content of each component described above can be determined.

In the energy absorption member of the present embodiment, the fiber diameter of the glass fiber which is the reinforcement fiber is, for example, in the range of 3 to 30 µm, preferably in the range of 6 to 25 µm, more preferably in the range of 11 to 24 µm, and further preferably in the range of 13 to 23 µm.

In this regard, when the cross-sectional shape of a glass filament forming the glass fiber is perfect circular or nearly perfect circular, the fiber diameter of the glass fiber means the diameter of the glass filament. Meanwhile, when the cross-sectional shape of a glass filament is other than perfect circular or nearly perfect circular (for example, oval, or long-oval), the fiber diameter of the glass fiber means the diameter of the perfect circle having the same area as the area of the cross section with such a shape (referred to as "equivalent fiber diameter").

In the energy absorption member of the present embodiment, there is no particular restriction on the cross-sectional shape of the glass fiber which is the reinforcement fiber (generally, a glass fiber is composed of a bundle of a plurality of glass filaments, and the cross-sectional shape of the glass filament is referred to as the cross-sectional shape of the glass fiber). In the energy absorption member of the present embodiment, examples of the cross-sectional shape that can be taken by the glass fiber (that is, the cross-sectional shape that can be taken by a glass filament) may include perfect circle, oval, and long-oval. When the cross-sectional shape of the glass fiber is oval or long-oval, the ratio of the major axis to the minor axis of the cross-sectional shape (major axis/minor axis) is, for example, in the range of 2.0 to 10.0.

In the energy absorption member of the present embodiment, the number of glass filaments constituting the glass fiber which is the reinforcement fiber is, for example, in the range of 400 to 6000, preferably in the range of 600 to 4500, more preferably in the range of 800 to 3,000, and further preferably in the range of 800 to 2,000.

In the energy absorption member of the present embodiment, the surface of the reinforcement fibers may be coated with an organic substance for the purpose of, for example, enhancing the adhesion between the reinforcement fibers and a curable resin composition with which the reinforcement fibers are impregnated. Examples of such an organic substance may include starch, a urethane resin, an epoxy resin, an unsaturated polyester resin, a vinyl acetate resin, an acrylic resin, a modified polypropylene (especially carboxylic acid modified polypropylene), and a copolymer of a (poly)carboxylic acid (especially maleic acid) and an unsaturated monomer. Further, in the energy absorption member of the present embodiment, the reinforcement fibers may be coated with a resin composition containing a silane coupling agent, a lubricant, a surfactant, etc. in addition to the above resins. Such a resin composition is coated on the glass fiber at a proportion of 0.1 to 2.0% by mass based on the mass of the glass fiber in a state of not being coated with the resin composition. In this regard, coating on the glass fiber with an organic substance may be performed, for example, in a production process for glass fibers by applying a resin solution or a resin composition solution onto the glass fibers using a publicly known means such as a roller applicator, and then drying the glass fibers having received the resin solution or resin composition solution.

In this regard, examples of the silane coupling agent include aminosilane (such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane), chlorosilane (such as rglycidoxypropyltrimethoxysilane), epoxysilane (such as β-(3,4-epoxycyclohexyl)ethyltrimethoxysilane), mercaptosilane (such as γ-mercaptotrimethoxysilane including γ-chloropropyltrimethoxysilane), vinylsilane (such as vinyltrimethoxysilane, and N-β-(N-vinylbenzylaminoethyl)-γ-aminopropyltrimethoxysilane), acryl silane (such as γ-methacryloxypropyl trimethoxysilane). The silane coupling agents may be used singly or in combinations of two or more thereof.

Examples of the lubricant include a modified silicone oil, an animal oil (such as beef tallow) and a hydrogenated product thereof, a vegetable oil (such as soybean oil, coconut oil, rapeseed oil, palm oil, and castor oil) and a hydrogenated product thereof, an animal wax (such as beeswax, and lanolin), a vegetable wax (such as candelilla wax, and carnauba wax), a mineral wax (such as paraffin wax, and montan wax), a condensation product of a higher saturated fatty acid and a higher saturated alcohol (such as stearic acid ester, including lauryl stearate), a polyethylenimine, an alkylamide derivative of a polyalkylpolyamine, a fatty acid amide (such as a dehydration condensation product of a polyethylenepolyamine such as diethylenetriamine, triethylenetetramine, and tetraethylenepentamine, and a fatty acid such as lauric acid, myristic acid, palmitic acid, and stearic acid), and a quaternary ammonium salt (an alkyl trimethyl ammonium salt such as lauryl trimethyl ammonium chloride). The lubricants may be used singly or in combinations of two or more thereof.

Examples of the surfactant include a nonionic surfactant, a cationic surfactant, an anionic surfactant, and an amphoteric surfactant.

Examples of a nonionic surfactant include ethylene oxide/propylene oxide alkyl ether, polyoxyethylene alkyl ether, polyoxyethylene-polyoxypropylene block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, ethylene oxide adduct of glycerol fatty acid ester, polyoxyethylene castor oil ether, ethylene oxide adduct of hydrogenated castor oil, ethylene oxide adduct of alkylamine, ethylene oxide adduct of fatty acid amide, glycerol fatty acid ester, polyglycerin fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of a cationic surfactant include alkyl dimethyl benzyl ammonium chloride, alkyl trimethyl ammonium chloride, alkyl dimethyl ethyl ammonium ethyl sulfate, a higher alkyl amine salt (such as acetate and hydrochloride), ethylene oxide adduct of a higher alkyl amine, a condensation product of a higher fatty acid and a polyalkylene polyamine, a salt of an ester of a higher fatty acid and an alkanolamine, a salt of a higher fatty acid amide, an imidazoline type cationic surfactant, and an alkyl pyridinium salt.

Examples of an anionic surfactant include a higher alcohol sulfuric acid ester salt, a higher alkyl ether sulfuric acid ester salt, an α-olefin sulfuric acid ester salt, an alkyl benzene sulfonate, an a-olefin sulfonic acid salt, a reaction product of a fatty acid halide and N-methyl taurine, a sulfosuccinic acid dialkyl ester salt, a higher alcohol phosphoric acid ester salt, and a phosphoric acid ester salt of an ethylene oxide adduct of a higher alcohol.

Examples of an amphoteric surfactant include an amino acid-type amphoteric surfactant such as an alkali metal salt of alkylaminopropionic acid, and a betaine-type and imidazoline-type amphoteric surfactant such as alkyldimethyl betaine.

The surfactants may be used singly or in combinations of two or more thereof.

In the energy absorption member of the present embodiment, when the volume content of the reinforcement fibers in the fiber-reinforced composite material is less than 30%, fracture by impact does not uniformly propagate and stable absorption of the impact is not possible. Meanwhile, when the volume content of the reinforcement fibers is more than 80%, the reinforcement fibers are not sufficiently impregnated with a curable resin composition, and a fiber-reinforced composite material is not producible.

Further, in the energy absorption member of the present embodiment, for attaining a high amount of energy absorbed, the volume content of the reinforcement fibers in a fiber-reinforced composite material is preferably 45 to 75%, more preferably 50 to 70%, and further preferably 55 to 65%.

The volume content of the reinforcement fibers in a fiber-reinforced composite material can be calculated in accordance with JIS K7053.

In the energy absorption member of the present embodiment, the curable resin composition may contain a curable resin, and an additive other than a reinforcement fiber. In the energy absorption member of the present embodiment, the volume content of the curable resin in the fiber-reinforced composite material is, for example, 20 to 70%. Also, in the fiber-reinforced composite material, the volume content of the additive other than a reinforcement fiber is, for example, 0 to 10%.

The curable resin may be a thermosetting resin or a photocurable resin, but is preferably a thermosetting resin, because the degree of freedom can be high in molding in the thickness direction.

Examples of the curable resin may include an unsaturated polyester resin, a vinyl ester resin, an epoxy (EP) resin, a melamine (MF) resin, a phenol resin (PF), a urethane resin (PU), a polyisocyanate, a polyisocyanurate, a polyimide (PI), a urea (UF) resin, a silicone (SI) resin, a furan (FR) resin, a benzoguanamine (BR) resin, an alkyd resin, a xylene resin, a bismaleimide triazine (BT) resin, and a diallyl phthalate resin (PDAP).

Specific examples of an unsaturated polyesters include a resin obtained as an esterification reaction product of an aliphatic unsaturated dicarboxylic acid and an aliphatic diol.

Examples of a vinyl ester resin include a bis type vinyl ester resin, and a novolac type vinyl ester resin.

Examples of an epoxy resin include a bisphenol A epoxy resin, a bisphenol F epoxy resin, a bisphenol E epoxy resin, a bisphenol S epoxy resin, a bisphenol M epoxy resin (4,4'-(1,3-phenylenediisopropylidene)bisphenol epoxy resin), a bisphenol P epoxy resin (4,4'-(1,4-phenylenediisopropylidene)bisphenol epoxy resin), a bisphenol Z epoxy resin (4,4'-cyclohexylidenebisphenol epoxy resin), a phenol novolac epoxy resin, a cresol novolac epoxy resin, a tetraphenol group ethane type novolac epoxy resin, a novolac epoxy resin having a condensed ring aromatic hydrocarbon structure, a biphenyl epoxy resin, an aralkyl epoxy resin, such as a xylylene epoxy resin, and a phenyl aralkyl epoxy resin, a naphthylene ether epoxy resin, a naphthol epoxy resin, a naphthalenediol epoxy resin, a bifunctional to tetrafunctional epoxy naphthalene resin, a binaphthyl epoxy resin, a naphthalene aralkyl epoxy resin, an anthracene epoxy resin, a phenoxy epoxy resin, a dicyclopentadiene epoxy resin, a norbornene epoxy resin, an adamantane epoxy resin, and a fluorene epoxy resin.

Examples of a melamine resin include a product polymer of polycondensation of melamine (2,4,6-triamino-1,3,5-triazine) and formaldehyde.

Examples of a phenol resin include novolac phenol resin such as a phenol novolac resin, a cresol novolac resin, and a bisphenol A novolac resin, a resol phenol resin, such as a methylol resol resin, and a dimethylene ether resol resin, and an aryl alkylene phenol resin. These may be used singly or in combinations of two or more thereof.

Examples of a urea resin include a resin obtained by condensation of urea and formaldehyde.

The curable resins may be used singly or in combinations of two or more thereof.

Examples of the additive other than a reinforcement fiber may include a filler other than a reinforcement fiber (such as glass powder, talc, and mica), a flame retardant, a UV absorber, a heat stabilizer, an antioxidant, an antistatic agent, a flow modifier, an antiblocking agent, a lubricant, a nucleating agent, an antibacterial agent, a pigment, and a thermoplastic resin.

In the energy absorption member of the present embodiment, the fiber-reinforced composite material may be obtained by filament winding molding, sheet winding molding, autoclave molding, infusion molding, resin transfer molding, or the like using the reinforcement fibers and the curable resin composition.

In the energy absorption member of the present embodiment, the fiber-reinforced composite material takes a hollow cylindrical shape. In this case, the inner diameter of the fiber-reinforced composite material is, for example, 50 to 200 mm, preferably 70 to 130 mm. Further, the outer diameter of the fiber-reinforced composite material is, for example, 80 to 250 mm, preferably 100 to 150 mm. Further, the length of the fiber-reinforced composite material is, for example, 100 to 150 mm.

In the energy absorption member of the present embodiment, one or more, for example, 100 to 10000 reinforcement fibers are included in the fiber-reinforced composite material. Each reinforcement fiber is a continuous fiber having a fiber length of at least 1000 mm, and is disposed in a side wall section of the fiber-reinforced composite material having a hollow cylindrical shape from the upper end of the side wall section through to the lower end without breakage.

Figure 2:
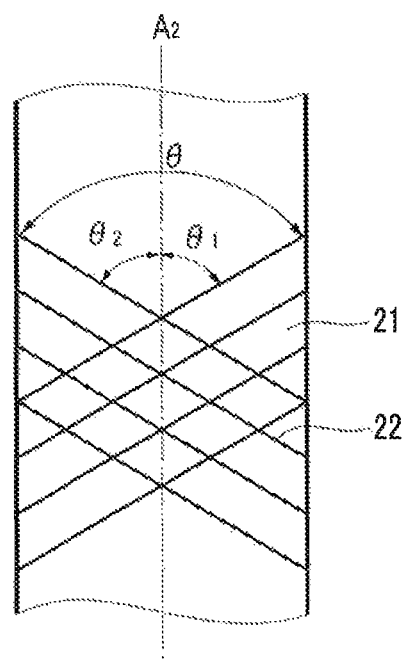
FIG. 2 is a diagram showing the crossing angle of reinforcement fibers in a fiber-reinforced composite material composing the energy absorption member of the present invention, and the angle of the reinforcement fibers with respect to the central axis of the fiber-reinforced composite material.

In the energy absorption member of the present embodiment, as shown in FIG. 2, the reinforcement fibers 22 constituting the energy absorption member (fiber-reinforced composite material) 21 are preferably arranged in the fiber-reinforced composite material such that a plurality of reinforcement fibers 22 form spirals in directions crossing each other, because the recoil at the moment of receiving an impact becomes small more reliably, and the fracture by impact uniformly propagates more reliably, so that an impact can be stably absorbed.

In this regard, for facilitating stable absorption of an impact by means of uniform propagation of fracture by impact, the crossing angle θ of the reinforcement fibers 2 that intersect each other is preferably 100° or more and 160° or less. The crossing angle θ is more preferably in the range of 105° or more and 140° or less, and further preferably in the range of 110° or more and 130° or less.

In addition, for realizing an extremely high amount of energy absorbed by means of reduction of the recoil at the moment of receiving an impact, the crossing angle θ of the reinforcement fibers that intersect each other is preferably 70° or more and less than 100°, and more preferably 80° or more and 95° or less.

Further, in the energy absorption member of the present embodiment, the angle $\theta_1$ of a reinforcement fiber 2 and the angle $\theta_2$ of the other reinforcement fiber 2 with respect to the central axis $A_2$ of the fiber-reinforced composite material are preferably the same. When the angle $\theta_1$ and the angle $\theta_2$ of the reinforcement fibers 2 with respect to the central axis $A_2$ of the fiber-reinforced composite material 1 are the same, an energy absorption member capable of absorbing more stably an impact can be obtained.

Examples of the applications of the energy absorption member of the present embodiment may include a crush box, a front side member, and a rear side member.

Examples and Comparative Examples of the present invention will be described below.

EXAMPLE

Example 1

[Method for Forming Energy Absorption Member]

As the reinforcement fiber 2, the glass fiber GF-A shown in Table 1 was used, and as the curable resin composition, an epoxy resin composition (a mixture of an epoxy resin XNR6805 (trade name, produced by Nagase ChemteX Corporation), a curing agent XNH6805 (trade name, produced by Nagase ChemteX Corporation), and a curing accelerator XNA6805 (trade name, produced by Nagase ChemteX Corporation) at a weight ratio of 100:100:2) was used.

First, an SUS mandrel with an outer diameter of 100 mm, which was semi-mirror finished and release-treated, was mounted on a filament winding device, and then the glass fiber GF-A was set on a yarn feeding device for supplying a reinforcement fiber and controlling the tension thereof, and an epoxy resin composition prepared in the above ratio was charged into the resin bath in the filament winding apparatus.

Next, the glass fiber GF-A was wound around the mandrel, while being impregnated with the epoxy resin composition in the resin bath and applied with a tension, at a winding angle of +60° with respect to the rotation axis (central axis $A_2$) of the mandrel set as 0° to form the first layer, and at −60° to form the second layer, forming totally 2 layers (In FIG. 2, Crossing angle θ=120°, Angle $θ_1$ of reinforcement fiber 2 with respect to central axis $A_2$=Angle $θ_2$=60°).

Next, the glass fiber GF-A impregnated with the obtained epoxy resin composition was cured by heating at 85° C. for 4 hours.

Next, the cured product of the glass fiber GF-A impregnated with the epoxy resin composition was separated from the mandrel using a core remover to obtain a hollow cylindrical fiber-reinforced composite material 1 with an outer diameter of 130 mm, and an inner diameter of 100 mm.

The hollow cylindrical fiber-reinforced composite material 21 was cut with a lathe so as to have a length of 135 mm in a state where an aluminum alloy core was inserted to secure the parallelism at both the ends and to suppress deformation in the radial direction thereby completing an energy absorption member 21.

[Evaluation Method of Energy Absorbing Material]

The energy absorption characteristics of the energy absorption member 1 were evaluated by an impact test using a large-size falling weight impact test machine.

In the impact test, an energy absorption member 1 was held with the upper fixture and the lower fixture, and a falling weight having a mass of 200 kg was made to free-fall on to the upper fixture from a height of 2.46 m to gain a striking velocity of 25 km/h to apply an impact compressive load in the axial direction to the energy absorption member.

The impact load was measured by a load cell placed under the lower fixture, and the displacement was measured by an image analysis of a motion picture taken with a high-speed camera. The results are shown in Table 2.

Example 2

A hollow cylindrical fiber-reinforced composite material 1 was formed and evaluated in exactly the same manner as Example 1 except that the winding angle of the reinforcement fiber 2 by the filament winding device was changed to +45° for the first layer, and −45° for the second layer (in FIG. 2, Crossing angle θ=90°, Angle $θ_1$ of reinforcement fiber 2 with respect to central axis $A_2$=Angle $θ_2$=45°. The results are shown in Table 2.

Comparative Example 1

A hollow cylindrical fiber-reinforced composite material 1 was formed and evaluated in exactly the same manner as Example 1 except that the glass fiber GF-B shown in Table 1 was used as the reinforcement fiber 2. The results are shown in Table 2.

Comparative Example 2

A hollow cylindrical fiber-reinforced composite material 1 was formed and evaluated in exactly the same manner as Example 1 except that a carbon fiber (product name: T700-SC, produced by Toray Industries, Inc., represented as CF in Table 2) was used as the reinforcement fiber 2. The results are shown in Table 2.

TABLE 1

| | | GF-A | GF-B |
|---|---|---|---|
| Glass fiber composition | $SiO_2$ (wt %) | 59.3 | 54.6 |
| | $Al_2O_3$ (wt %) | 19.0 | 14.1 |
| | MgO (wt %) | 10.0 | 1.2 |
| | CaO (wt %) | 11.0 | 22.4 |
| | $B_2O_3$ (wt %) | 0.5 | 6.1 |
| | Others (wt %) | 0.2 | 1.4 |
| | $SiO_2 + Al_2O_3 +$ MgO (wt %) | 88.3 | 69.9 |
| | $MgO/SiO_2$ | 0.169 | 0.02 |
| Glass fiber diameter (μm) | | 23 | 23 |
| Filament cross-sectional shape | | perfect circle | perfect circle |
| Number of filaments in bundle | | 2000 | 2000 |
| Weight (tex) | | 2250 | 2250 |
| Surface treatment | | Silane coupling agent Unsaturated polyester resin | Silane coupling agent Unsaturated polyester resin |

TABLE 2

| | | Example 1 | Example 2 | Comparative Example 1 | Comparative Example 2 |
|---|---|---|---|---|---|
| Reinforcement fiber | Kind | GF-A | GF-A | GF-B | CF |
| | Tensile strength S (GPa) | 4.3 | 4.3 | 3.2 | 4.9 |
| | Tensile modulus of elasticity M (GPa) | 83 | 83 | 75 | 230 |
| | Elongation rate E (%) | 5.9 | 5.9 | 4.7 | 2.1 |
| | $S^2 \times M^{1/8}/E^{1/2}$ | 13.2 | 13.2 | 8.1 | 32.7 |
| Crossing angle θ (°) | | 120 | 90 | 120 | 120 |
| Angle of reinforcement fiber 2 with respect to central axis $A_2$ | $θ_1$ (°) | 60 | 45 | 60 | 60 |
| | $θ_2$ (°) | 60 | 45 | 60 | 60 |
| Volume content of reinforcement fiber (%) | | 60 | 60 | 60 | 60 |
| Maximum load-First local minimum point load (kN) | | 25.5 | 13 | 18.8 | 41.9 |

TABLE 2-continued

| | Example 1 | Example 2 | Comparative Example 1 | Comparative Example 2 |
|---|---|---|---|---|
| Maximum local maximum point load - Minimum local minimum point load (kN) | 16.4 | 21 | 33.1 | 22.9 |
| Total amount of energy absorbed at 70 mm (J) | 3268 | 3492 | 2963 | 3145 |

As is apparent from Table 2, with respect to each energy absorption member 1 of Examples 1 and 2, in which the tensile strength S (GPa), tensile modulus of elasticity M (GPa), and elongation rate E (%) of the reinforcement fibers 2 satisfy the following expression (1), and the volume content of the reinforcement fibers 2 in the fiber-reinforced composite material is 30 to 80%; the difference between the maximum load and the first local minimum point load is 30 kN or less, so that the recoil at the moment of receiving an impact is small, and the difference between the maximum local maximum point load and the minimum local minimum point load is 25 kN or less, so that the fracture by impact uniformly propagates, and stable absorption of an impact is possible.

$$11.0 \leq S^2 \times M^{1/8}/E^{1/2} \leq 22.0 \quad (1)$$

Meanwhile, with respect to the energy absorption member of Comparative Example 1, in which the value of $S^2 \times M^{1/8}/E^{1/2}$ is less than 11.0, the difference between the maximum local maximum point load and the minimum local minimum point load exceeds 25 kN, the fracture by impact does not propagate uniformly, and stable absorption of an impact is not possible.

Further, with respect to the energy absorption member of Comparative Example 2, in which the value of $S^2 \times M^{1/8}/E^{1/2}$ exceeds 22.0, the difference between the maximum load and the first local minimum point load is beyond 30 kN, and the recoil at the moment of receiving an impact cannot be reduced.

REFERENCE SIGNS LIST

11: Monofilament test piece, 12: Cut out section, 13: Grip section, 14: Support section, 21: Energy absorption member, 22: Reinforcement fiber, F: Monofilament, P: Mount

The invention claimed is:

1. An energy absorption member comprising:
a hollow cylindrical body formed of a fiber-reinforced composite material composed of:
a plurality of reinforcing fibers which are exclusively glass fibers, in which tensile strength S (GPa), tensile modulus of elasticity M (GPa), and elongation rate E (%) satisfy the following expression (1), and
a curable resin composition with which the glass fibers are impregnated;
wherein said cylindrical body is a crushable component of a part that is configured to be crushed in a collision and to absorb collision energy generated by an impact during the collision,
wherein the reinforcing fibers are arranged inside of the cylindrical body in a manner such that in the event of said collision, a fracture, generated by the impact, propagates substantially uniformly through said energy absorption member,
wherein a volume content of the glass fibers in the fiber-reinforced composite material is 30 to 80%, and
wherein the glass fibers have a diameter in a range of 11 to 30 μm $$11.0 \leq S^2 \times M^{1/8}/E^{1/2} \leq 22.0 \quad (1).$$

2. The energy absorption member according to claim 1, wherein a plurality of the glass fibers are disposed in the fiber-reinforced composite material in spiral forms and in directions crossing each other, and a crossing angle of the glass fibers crossing each other is 100° or more and 160° or less.

3. The energy absorption member according to claim 1, wherein a plurality of the glass fibers are disposed in the fiber-reinforced composite material in spiral forms and in directions crossing each other, and a crossing angle of the glass fibers crossing each other is 70° or more and less than 100°.

4. The energy absorption member according to claim 1, wherein the volume content of the glass fibers in the fiber-reinforced composite material is 50 to 70%.

5. The energy absorption member according to claim 1, wherein the glass fiber comprises $SiO_2$ in a range of 56.5 to 68.0% by mass, $Al_2O_3$ in a range of 13.0 to 28.0% by mass, and MgO in a range of 5.0 to 12.0% by mass based on a total amount of the glass fiber, and wherein
a total content of $SiO_2$, $Al_2O_3$, and MgO is 77.0% by mass or more, and
a ratio ($MgO/SiO_2$) of a content of MgO to a content of $SiO_2$ is 0.09 to 0.18.

6. The energy absorption member according to claim 2, wherein the volume content of the glass fibers in the fiber-reinforced composite material is 50 to 70%.

7. The energy absorption member according to claim 3, wherein the volume content of the glass fibers in the fiber-reinforced composite material is 50 to 70%.

8. The energy absorption member according to claim 2, wherein the glass fiber comprises $SiO_2$ in a range of 56.5 to 68.0% by mass, $Al_2O_3$ in a range of 13.0 to 28.0% by mass, and MgO in a range of 5.0 to 12.0% by mass based on a total amount of the glass fiber, wherein
a total content of $SiO_2$, $Al_2O_3$, and MgO is 77.0% by mass or more, and
a ratio ($MgO/SiO_2$) of a content of MgO to a content of $SiO_2$ is 0.09 to 0.18.

9. The energy absorption member according to claim 3, wherein the glass fiber comprises $SiO_2$ in a range of 56.5 to 68.0% by mass, $Al_2O_3$ in a range of 13.0 to 28.0% by mass, and MgO in a range of 5.0 to 12.0% by mass based on a total amount of the glass fiber, wherein
a total content of $SiO_2$, $Al_2O_3$, and MgO is 77.0% by mass or more, and
a ratio ($MgO/SiO_2$) of a content of MgO to a content of $SiO_2$ is 0.09 to 0.18.

10. The energy absorption member according to claim 4, wherein the glass fiber comprises $SiO_2$ in a range of 56.5 to 68.0% by mass, $Al_2O_3$ in a range of 13.0 to 28.0% by mass, and MgO in a range of 5.0 to 12.0% by mass based on a total amount of the glass fiber, wherein a total content of $SiO_2$, $Al_2O_3$, and MgO is 77.0% by mass or more, and a ratio ($MgO/SiO_2$) of a content of MgO to a content of $SiO_2$ is 0.09 to 0.18.

11. The energy absorption member according to claim 6, wherein the glass fiber comprises $SiO_2$ in a range of 56.5 to 68.0% by mass, $Al_2O_3$ in a range of 13.0 to 28.0% by mass, and MgO in a range of 5.0 to 12.0% by mass based on a total amount of the glass fiber, wherein a total content of $SiO_2$, $Al_2O_3$, and MgO is 77.0% by mass or more, and a ratio ($MgO/SiO_2$) of a content of MgO to a content of $SiO_2$ is 0.09 to 0.18.

12. The energy absorption member according to claim 7, wherein the glass fiber comprises $SiO_2$ in a range of 56.5 to 68.0% by mass, $Al_2O_3$ in a range of 13.0 to 28.0% by mass, and MgO in a range of 5.0 to 12.0% by mass based on a total amount of the glass fiber, wherein a total content of $SiO_2$, $Al_2O_3$, and MgO is 77.0% by mass or more, and a ratio ($MgO/SiO_2$) of a content of MgO to a content of $SiO_2$ is 0.09 to 0.18.

13. The energy absorption member of claim 2, wherein a first group of the reinforcement fibers and a second group of the reinforcement fibers extend spirally in opposite directions from one another, wherein each of the first and second groups defines a winding angle with respect to a central axis of the cylindrical body, and wherein the winding angles of the first and second groups are equal to one another.

14. The energy absorption member of claim 3, wherein a first group of the reinforcement fibers and a second group of the reinforcement fibers extend spirally in opposite directions from one another, wherein each of the first and second groups defines a winding angle with respect to a central axis of the cylindrical body, and wherein the winding angles of the first and second groups are equal to one another.

* * * * *